United States Patent
Leupold

(10) Patent No.: US 9,056,725 B1
(45) Date of Patent: Jun. 16, 2015

(54) STATIC-RESISTANT TRANSPORT MECHANISM FOR A PRODUCT CONVEYING SYSTEM

(76) Inventor: Steven Leupold, Ashby, MA (US)

( * ) Notice: Subject to any disclaimer, the term of this patent is extended or adjusted under 35 U.S.C. 154(b) by 879 days.

(21) Appl. No.: 12/856,958

(22) Filed: Aug. 16, 2010

Related U.S. Application Data

(60) Provisional application No. 61/234,392, filed on Aug. 17, 2009.

(51) Int. Cl.
*B65G 25/04* (2006.01)

(52) U.S. Cl.
CPC ...................... *B65G 25/04* (2013.01)

(58) Field of Classification Search
USPC .............. 198/750.2; 209/921; 110/298
See application file for complete search history.

(56) References Cited

U.S. PATENT DOCUMENTS

| | | | |
|---|---|---|---|
| 4,339,114 A * | 7/1982 | Deike | 256/12.5 |
| 6,651,842 B2 | 11/2003 | Collins et al. | |
| 7,926,646 B1 * | 4/2011 | Berthelsen et al. | 198/750.3 |
| 2003/0136892 A1 * | 7/2003 | Doucet et al. | 248/346.2 |
| 2004/0164286 A1 * | 8/2004 | Lemay | 256/32 |
| 2009/0057497 A1 * | 3/2009 | Bradbury | 248/68.1 |
| 2009/0057638 A1 * | 3/2009 | Hoggan | 256/34 |
| 2009/0213688 A1 * | 8/2009 | Tamminga et al. | 366/186 |
| 2010/0064870 A1 * | 3/2010 | Olsen | 83/177 |

* cited by examiner

*Primary Examiner* — Joseph Dillon, Jr.
(74) *Attorney, Agent, or Firm* — Dingman, McInnes & McLane, LLP

(57) ABSTRACT

A static resistant transport mechanism is configured as a set of slats where each slat is manufactured from a static-dissipative or static-resistive material to minimize or eliminate the buildup of an electrical or static charge in the product conveying system. With such a configuration, the static-resistant transport mechanism minimizes the likelihood of product either failing to enter a slat cavity from a hopper, prematurely exiting a slat cavity prior to dispenzation into a container at a dispensing location, or failing to exit a slat cavity and enter the container at the dispensing location. Accordingly, because the product conveying system can deliver product to containers for an extended period of time with a relatively low rate of error, the static resistant transport mechanism minimizes down time associated with the product conveying system.

8 Claims, 4 Drawing Sheets

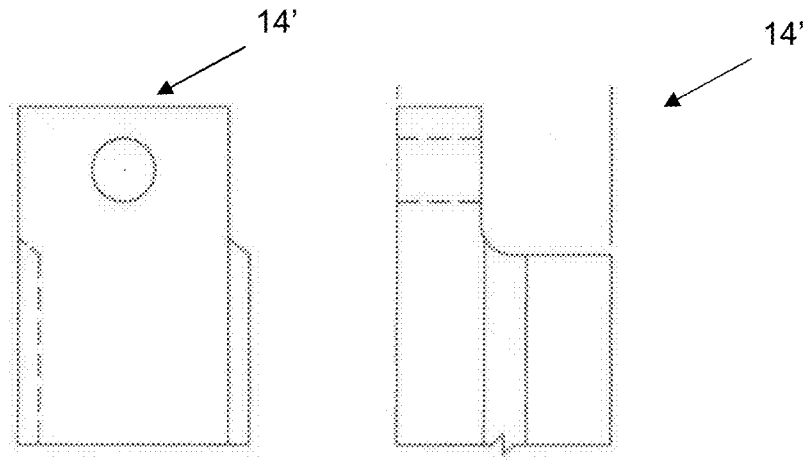
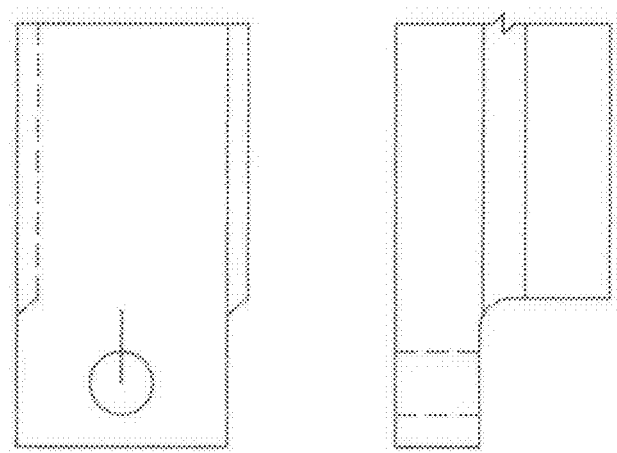
FIG.6  FIG. 7
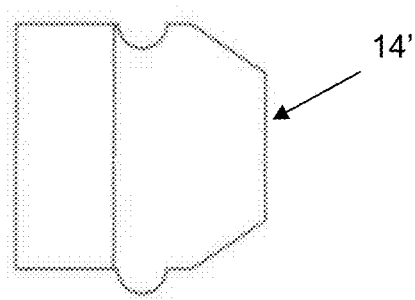
FIG. 8

STATIC-RESISTANT TRANSPORT MECHANISM FOR A PRODUCT CONVEYING SYSTEM

CROSS REFERENCE TO RELATED APPLICATIONS

This Patent Application claims priority to U.S. Provisional Patent Application No. 61/234,392 filed on Aug. 17, 2009, entitled, "STATIC-RESISTANT TRANSPORT MECHANISM FOR PRODUCT CONVEYOR," the contents and teachings of which are hereby incorporated by reference in their entirety.

BACKGROUND

Conveying machines or conveyors are typically used in a variety of industries to transport items from one location to another. Depending upon the particular industry and the particular use, conveyors can be adapted or configured in specific ways. For example, pharmaceutical companies or drug manufacturers utilize conveyor devices to dispense and count tablets or capsules (i.e., pharmaceutical products), as provided from a feed source or hopper, into containers, such as plastic bottles. To provide such transport, the conventional conveyor device includes a set of slats and a drive mechanism that moves the set of slats from the hopper to the containers. Each slat defines a set of cavities that separates and holds the product. By separating the product into separate cavities, the slats allow the conveyor device to count and dispense the product into the bottle, according to particular set-up and control instructions.

SUMMARY

Conventional conveyor devices such as used in the pharmaceutical industry, however, suffer from a variety of deficiencies. For example, for conveyors used in the pharmaceutical industry, the slats are typically manufactured from a Food and Drug Administration (FDA) approved high density polyethylene (HDPE) material. During operation, as the drive mechanism advances each HDPE slat of the set of slats toward the dispensing area, the movement of the set of slats and other parts associated with the conveyor device causes a build-up of an electrical charge (i.e., static electricity) on the slats. Additionally, conventional conveyor devices include one or more rotary brushes used to brush back overflow product, guide the product into the slat cavities and to clean dust from the slats (e.g., dust created by interaction of the products with each other while stored in and ejected from a product hopper), as accumulated during operation. The use of the rotary brushes can also contribute to the build-up of static electricity on the HDPE slats.

Static electricity increases the likelihood of the slat erroneously mishandling the product. For example, the build-up of a static charge can prevent the product from entering a slat cavity from a hopper to result in an empty cavity, can cause the product to prematurely exit a slat cavity prior to dispensation into a bottle (e.g., by repelling the product from a slat cavity via electrostatic force) resulting in a missing product, or can prevent the product from exiting the slat cavity (e.g., by adhering the product to a slat cavity via electrostatic force) and entering a container at a dispensing location resulting in a carry around. When one of these situations arises (i.e., an empty cavity), the conveyor device can detect an error in the amount of product dispensed to a particular container if equipped with an electronic detection apparatus. This particular container will be tracked and rejected by the conveyor device. When the missing product or carry around occurs it may not be detected by the electronic detection apparatus. As a result short count bottle has now been created which is considered a gross defect in manufacturing. In response, if noticed by the operator, the manufacturer would have to temporarily shut down production and remove erroneous container from the line. This process is time consuming and costly. Machines without an electronic detection apparatus rely on visual inspection by the machine operator. While minimizing errors, again, such a process is time consuming and costly. Static electricity can also increase the slats attraction of dust and other contaminants, thereby requiring additional cleaning time.

Additionally, static electricity built-up on the HDPE slats can adversely affect the electronics, such as a controller having a memory and a processor, controlling the conveyor device. For example, the static electricity can cause the controller to operate improperly and generate product miscounts for containers or bottles that otherwise include the correct, preset amount of product. Again, in response to the erroneous count generated by the controller, good bottles would be rejected. All rejected products must be handled, disposed of, or otherwise accounted for depending on protocol for that operation The manufacturer would have to temporarily shut down production, correct the problem, and spend time and effort dealing with product rejected that was in reality a good product. (i.e., a non-erroneous bottle). This again is costly and time consuming to the manufacturer.

Certain conventional conveyor devices utilize add-on static eliminator mechanisms in an attempt to limit static accumulation by the conveyor devices. For example, anti-static bars and blowers are typically used to reduce or eliminate static on conventional conveyor devices. However, these static eliminator mechanisms are mounted on the conveyor devices only where physical room is available. In certain cases, an end-user may not be able to attach the add-on static eliminator mechanisms to the conveyor devices based upon the physical constraints of the devices. Additionally, because the static eliminator devices are add-ons, the use of the static eliminator devices can increase the costs associated with the conventional conveyor devices.

Also in certain conventional conveyor devices, testing the devices for proper operation in at least one case involves a high voltage discharge. Loss of electrical ground to the devices over time, in at least one case, causes an electrical arc. The situation of stray electrical voltages throughout the conveyor device is not acceptable in an environment of low voltage electronics, operating personnel, and maintenance personnel.

By contrast to conventional conveyor devices, embodiments of the present invention relate to a static-resistant transport mechanism for a product conveying system. In one arrangement, the static resistant transport mechanism is configured as a set of slats where each slat is manufactured from a static-dissipative material or a static-resistive material to minimize or eliminate the build-up of an electrical or static charge in the product conveying system. With such a configuration, the static-resistant transport mechanism minimizes the likelihood of product either failing to enter a slat cavity from a hopper, prematurely exiting a slat cavity prior to dispensation into a container at a dispensing location, or failing to exit a slat cavity and enter the container at the dispensing location. Accordingly, because the product conveying system can deliver product to containers for an extended period of time with a relatively low rate of error, the static resistant transport mechanism minimizes down time associated with the product conveying system. Additionally, with such a configuration, the static-resistant transport mechanism minimizes the attraction of dust associated with the product (e.g., dust created by the products themselves), thereby increasing overall environmental safety in a facility utilizing the product conveying system. For example, by decreasing dust on the slats and brushes before the slats leave a confined area of a packaging room for cleaning or maintenance, a lower level of exposure and contamination would occur throughout the area where the slats travel, thereby minimizing contamination of other equipment and personnel. In one arrangement, the product conveying system includes one or more brushes manufactured from a static-dissipative material or a static-resistive material. Accordingly, as the brushes push the product into the slat cavities and clean the slats during operation, the brushes minimize the generation of a static charge in the product conveying system.

In one arrangement, a product dispensing apparatus includes a hopper configured to hold a volume of product, a dispensing area configured to receive product from the hopper, and a product conveying system configured to carry the product received from the hopper to the dispensing area. The product conveying system includes a drive motor a set of slats coupled to the drive motor. At least one slat of the set of slats defines a cavity sized to receive and carry an individual product from the hopper, the at least one slat of the set of slats formed from a static-resistant material.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

FIG. 6 illustrates a top view of a slat blank, according to one embodiment.

FIG. 7 illustrates a front sectional view of a slat blank, according to one embodiment.

FIG. 8 illustrates a side sectional view of a slat blank, according to one embodiment.

DETAILED DESCRIPTION

Embodiments of the present invention relate to a static-resistant transport mechanism for a product conveying system. In one arrangement, the static resistant transport mechanism is configured as a set of slats where each slat is manufactured from a static-dissipative material or a static-resistive material to minimize or eliminate the build-up of an electrical or static charge in the product conveying system. With such a configuration, the static-resistant transport mechanism minimizes the likelihood of product either failing to enter a slat cavity from a hopper, prematurely exiting a slat cavity prior to dispensation into a container at a dispensing location, or failing to exit a slat cavity and enter the container at the dispensing location. Accordingly, because the product conveying system can deliver product to containers for an extended period of time with a relatively low rate of error, the static resistant transport mechanism minimizes down time associated with the product conveying system. Additionally, with such a configuration, the static-resistant transport mechanism minimizes the attraction of dust associated with the product (e.g., dust created by the products themselves), thereby increasing overall environmental safety in a facility utilizing the product conveying system. In one arrangement, the product conveying system includes one or more brushes manufactured from a static-dissipative material or a static-resistive material. Accordingly, as the brushes push the product into the slat cavities and clean the slats during operation, the brushes minimize the generation of a static charge in the product conveying system.

Figure 1:
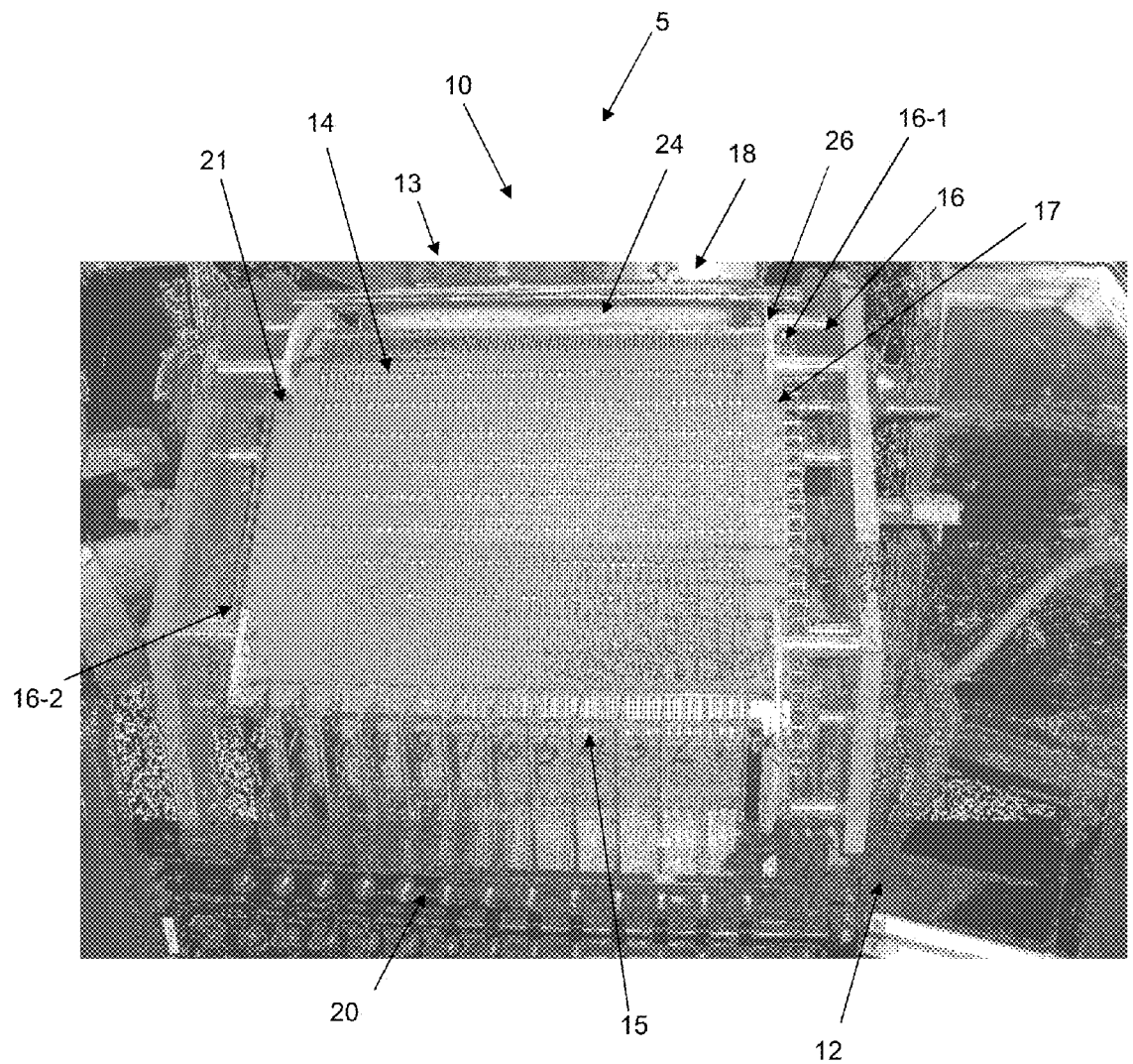
FIG. 1 illustrates a product dispensing apparatus having a set of slats manufactured from a static-dissipative or static-resistive material, according to one embodiment.

FIG. 1 illustrates an example of a product dispensing apparatus 5 having a feed source or hopper 18, a product conveying system 10, and a dispensing location or area 20. The product conveying system 10 is configured to dispense product, such as pharmaceutical product (e.g., pills, tablets, or capsules), provided from the hopper or feed source 18 into containers (not shown), such as plastic bottles, carried by dividers 15 associated with the dispensing area 20. The product conveying system 10 includes a drive mechanism 12, a static resistant transport mechanism 13, such as a set of slats 14, carried by the drive mechanism 12, and a counter apparatus (not shown) configured to count the number of products delivered by the static resistant transport mechanism 13 to one or more containers.

The drive mechanism 12 includes a motor (not shown) and a set of drive chains 16 operatively coupled between the motor and the set of slats 14. The drive mechanism 12 is configured to advance each slat of the set of slats 14 from an area disposed in proximity to the hopper 18 to the fill or dispensing area 20. For example, as illustrated in FIG. 1, the set of drive chains 16 includes a first drive chain 16-1 disposed in proximity to a first end of the slats 14 and a second drive chain 16-2 disposed in proximity to a second end of the slats. Each of the first and second drive chains 16-1, 16-2 includes a set of connection elements or sprockets 17 configured to couple to a corresponding set of drive coupling interfaces or openings 21 defined by the slats 14. During operation, based upon the interaction between the connection elements 17 and the corresponding openings 21 of the slats 14, the first and second drive chains 16-1, 16-2 circulate each of the slats 14 from the hopper area, to the fill area 20, and back to the hopper area to allow the slats 14 to receive and dispense product in a substantially continuous manner.

Additionally, based upon the interaction between the connection elements 17 and the corresponding openings 21 of the slats 14, each slat of the set of slats 14 is configured as a change part in the product conveying system 10 such that each slat 14 can be easily removed and replaced. For example, in one arrangement, each slat 14 is secured to corresponding connection elements 17 via a clearance fit between the openings 21 defined by the slat 14 and the corresponding connection elements 17. With such a configuration, a manufacturer can easily remove a slat 14 from the drive mechanism 12 when the slat becomes worn or a product change is required and replace the slat 14 while minimizing down time or non-operation associated with the product conveying system 10.

As indicated above, each slat 14 is configured to receive product from the hopper 18 and to carry the product to the dispensing area 20. In one arrangement, and with reference to FIGS. 3-5, each slat 14 defines a set of cavities 22 configured to carry product as part of the product conveying system 10. While the cavities 22 can be configured in a variety of ways, in one arrangement, the cavities 22 define a length 23, width 25, and depth 27 based upon the product being carried. As indicated above, the set of slats 14 can be configured to carry pharmaceutical product (e.g., pills, tablets, or capsules) from the hopper 18 to the dispensing area 20. Accordingly, in one arrangement, the size and shape of the pharmaceutical products influence the length 23, width 25, and depth 27 dimensions of each cavity 22 such that each cavity 22 can receive and carry only one pill or tablet. Alternately, the length 23, width 25, and depth 27 dimensions of each cavity 22 can be configured such that each cavity 22 can receive multiple pills or tablets. For example, depending upon the size of the pill or tablet to be carried, each cavity 22 of a slat 14 can define a length 23 between about 0.001 inches and 1.250 inches, a width 25 between about 0.001 inches and 0.625 inches, and a depth 27 between about 0.125 inches and 1.250 inches.

In one arrangement, the cavity 22 is configured to allow the product, such as the pill or tablet to easily enter and be retained by the cavity 22. For example, with reference to FIG. 5, the cavity 22 defines a leading wall portion 28 and a trailing wall portion 30. As illustrated, the leading wall portion 28 is sloped relative to an upper surface 32 of the slat 14. While the leading wall portion 28 can be sloped in a variety of ways, the leading wall portion can be radiused, curved, or angled, or any combination thereof, relative to the upper surface of the slat 14. The trailing wall portion 30 of the slat 14 is substantially orthogonal to the upper surface of the slat 14. Accordingly, during operation, as the slat 14 travels along direction 34 from the hopper 18 to the dispensing area 20 and as the hopper 18 ejects products toward the set of slats 14, the curved leading wall portion 28 guides a product (e.g., a pill or tablet) into the cavity 22 along direction 36, thereby minimizing possible non-entry of the product into the cavity 22. Furthermore, as the cavity 22 receives the product, the substantially orthogonal trailing wall portion 30 minimizes the possibility of the product bouncing out from the cavity 22 as a result of the product's velocity and interaction with the cavity 22 upon entry.

Additionally, each slat 14 includes a series of walls 40 that extend from the upper surface 32 of each slat 14 and along a width 42 of each slat 14 such that a pair of adjacent walls 40-1, 40-2 are disposed along either side of a cavity 22. With such a configuration, the walls 40-1, 40-2 form a set of guides for the corresponding cavity 22 such that, as the hopper 18 ejects products toward the set of slats 14, the walls 40-1, 40-2 direct the product to the corresponding cavity 22.

The length 38 of the slat 14 is dependent on the width of the device 10 to be used. The number of cavities 22 defined by the slat 14 is dependent upon the number of individual products that are required to be delivered to the dispensing area 20. For example, each slat of the set of slats 14 can have lengths of 13 inches, 15, inches, 18.985 inches, 19 inches, 37.75 inches, or 42 inches and can define between 15 and 240 cavities 22 along the length 38 of the slat 14.

The set of slats 14 is manufactured from a static-dissipative or a static-resistive material to minimize or eliminate the build-up of an electrical or static charge on the product conveying system 10. While the set of slats can be manufactured from a variety of static-dissipative or static-resistive materials, in one arrangement, each slat 14 is manufactured from a static-resistant, Food and Drug Administration (FDA)-approved high-density polyethylene (HDPE) material, as provided under the brand name ULTRA ETHYLUX by Westlake Plastics Company of Lenni, Pa. Such a static-resistant, FDA-approved HDPE material can have a polyethylene material content between about 80% and 90% weight and an antistatic additive material content between about 10% and 20% weight. In one arrangement, the antistatic additive material is substantially homogenously and permanently incorporated into the polyethylene material. With this an arrangement, a slat 14 manufactured from such a material does not require the application of an additional coating that can wear off or loose effectiveness over time.

The static-resistant, FDA-approved HDPE material has a surface resistivity of between about $10^9$ and $10^{11}$ ohms/square based upon the American Society for Testing and Materials (ASTM) D-257 Surface Resistivity test. The ASTM D-257 test is used to classify the performance of static-control packaging materials. Accordingly, for a slat 14 manufactured from such a material having such a range of surface resistivities, during operation, the material minimizes or prevents a build-up of a static charge on the slat 14 and on the product conveying system 10.

Figures 3, 4:
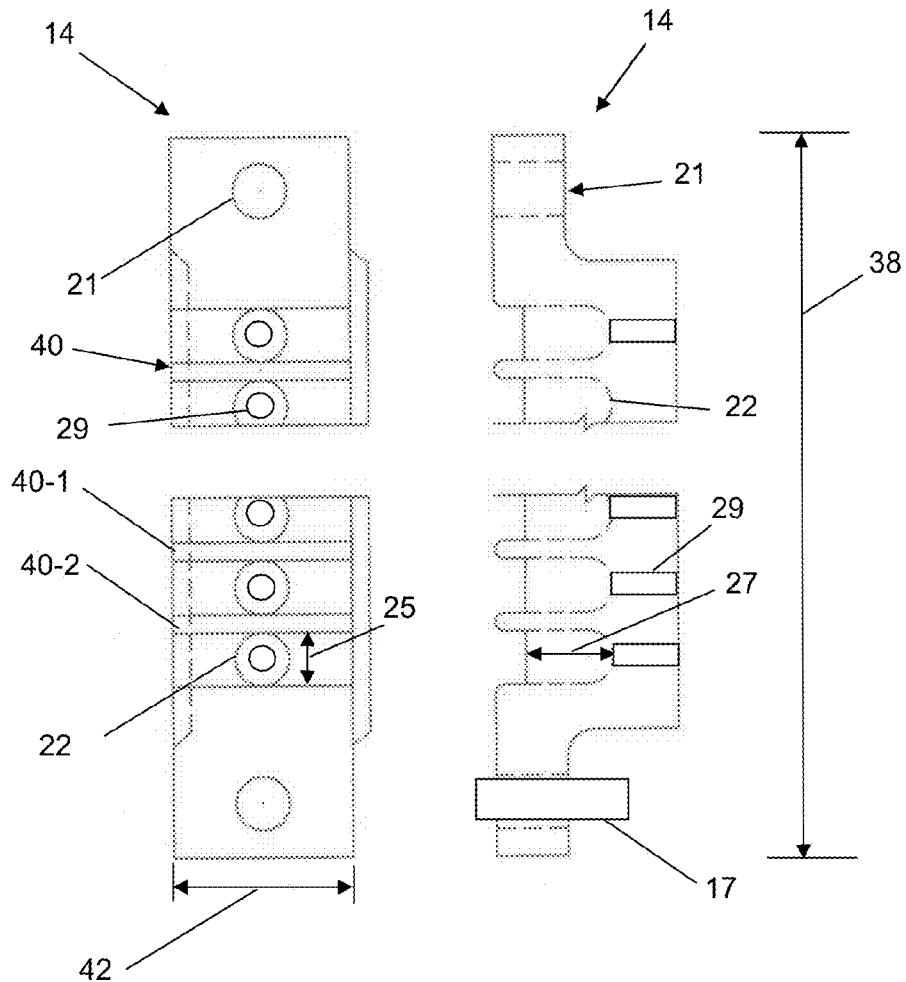
FIG. 3 illustrates a top view of a slat of the set of slats of FIG. 1, according to one embodiment.
FIG. 4 illustrates a front sectional view of a slat of the set of slats of FIG. 1, according to one embodiment.
Figure 5:
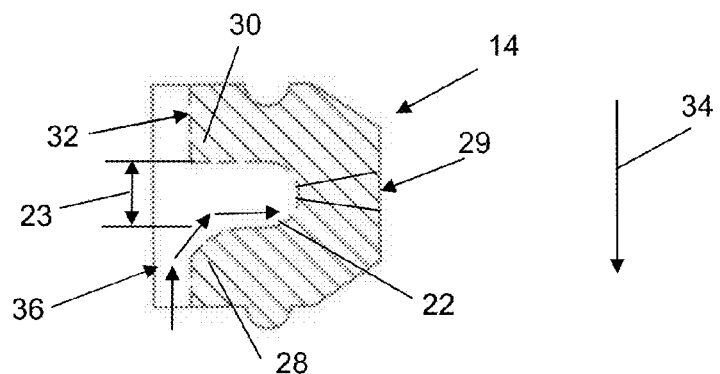
FIG. 5 illustrates a side sectional view of a slat of the set of slats of FIG. 1, according to one embodiment.

As indicated above, manufacturing the slats 14 from the static-resistant, FDA-approved HDPE material can minimize or eliminate the build-up of an electrical or static charge during operation. Additionally, the static-resistant, FDA-approved HDPE material (e.g., ULTRA ETHYLUX) has physical and mechanical properties that allow a manufacturer to machine the material into a slat 14 as shown in FIGS. 3-5 while maintaining a relatively smooth external surface finish on the work piece. For example, the static-resistant, FDA-approved HDPE material has a specific gravity of 0.95, a tensile strength of about 3800 psi, a flexural strength of about 5500 psi, a flexural modulus of about 135,000 psi, a melt temperature of about 375° F., and a mold temperature of about 100° F. The relatively smooth surface finish of the machined slat 14 allows the slat 14 to be utilized within the product conveying system 10 without requiring further surface finishing.

Figure 2:
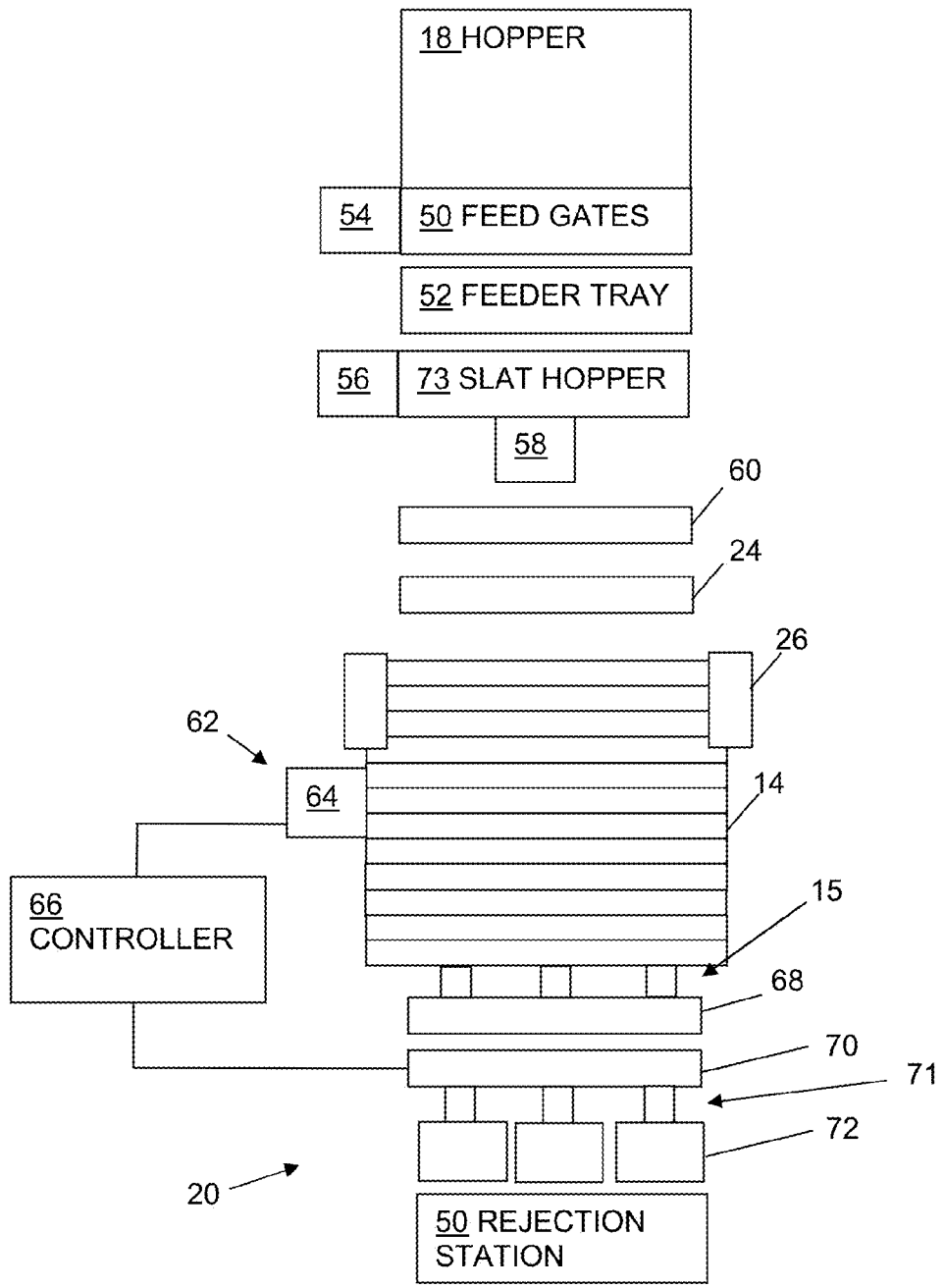
FIG. 2 is a schematic representation of the product dispensing apparatus of FIG. 1, according to one embodiment

As indicated above, during operation, the static resistant transport mechanism 13 minimizes the build-up of static associated with the product conveying system 10. FIG. 2 illustrates such operation of the product conveying system 10 of the product dispensing apparatus 5.

During operation, bulk product, such as pharmaceutical product, is held in the hopper 18, such as a hopper 18 having a 14,000 cubic inch capacity. The hopper 18 includes one or two adjustable flow gates 50 that control product delivery to one or two silty-feeder trays 52. With such an arrangement, the hopper 18 is an on-demand product feeding apparatus which, through photo-electric level sensors 54, controls the amount of product dispensed to the set of slats 14.

The product conveying system 10 includes a vibration mechanism operable to agitate the product in the slat hopper 73. For example, the vibration mechanism includes a first vibrator mechanism(s) 56 disposed on the side under the slat hopper 73 and a second vibrator mechanism(s) 58 disposed on the bottom under the slat hopper 73. In one arrangement, each vibrator mechanism 56, 58 has a corresponding intensity control, such as a potentiometer, used to adjust the level and/or frequency of the vibration generated by the vibrator mechanism 56, 58. When a user sets the intensity control to a particular level, as product exits the hopper 18, product fills all cavities 22 in the slats 14 disposed in proximity to the slat hopper 73.

The product, as carried by the slats 14, passes under a brush 24, such as a product control strip brush or a rotary brush, which removes dust from the product and from the slats 14 and that pushes any individual product elements not contained by a cavity 22 (i.e., stragglers) back into a slat hopper fill area (not shown). The brush 24, in one arrangement, is enclosed in a vacuum manifold 60 to aid in dust removal from the slats 14. The slats 14 then pass from the brush 24 through upper turn guides 26 and through an inspection area where an inspection system 62, such as a scanner 64 and a controller (e.g., a memory and a processor) scans the slats 14 in order to check for the presence of product in each of the cavities 22.

Once scanned, the product conveying system 10 advances the slats 14 toward the dispensing area 20 where the product is then purged from the slats 14 via a product purge system. For example, the slats 14 pass the product through a divider 15 over a drop point vacuumed manifold 68 to a product gate 70. The product gate 70 will open only when conditions are correct in the dispensing area 20 where the controller 66 controls operation of the product gate 70. Such action, in turn, causes the product to falls into chutes 71 where each chute 71 is designed for a particularly sized bottle or container 72 and is configured to guide the product into the corresponding container 72. The containers 72 are held in position relative to the product conveying system 10 by a physical set of stops that include air cylinders, a single feed screw, or two feed screws, such as a front lane and a rear lane feed screw (not shown). During operation, while one lane is indexing the containers to the dispensing area 20 the other lane is filled with containers 72. The dual lane feed screw drive system supplies the containers 72 to the bottle fill area at speeds that may exceed 300 bottles per minute (BPM). Containers 72 indexing the fill area are then conveyed past a reject station 74, which will reject containers 72 deemed rejected by the inspection system 62.

In one arrangement, the product purge system includes a set of purge pins (not shown) configured to purge or remove a product from a corresponding cavity. In such a configuration, with reference to FIGS. 3-5, each slat of the set of slats 14 defines a purge opening 29 configured to allow a corresponding purge pin to enter the cavity 22 and eject the product from the cavity 22. While the purge openings 29 can have a variety of shapes, in one arrangement, the openings 29 are tapered from a rear portion of the slat 14 toward the cavity 22 to guide the purge pins toward the cavity 22 during operation.

In the above-referenced system 10, because the slats 14 are formed from a static resistive or static dissipative material, the slats 14 minimize the generation and carrying of a static charge by the product conveying system 10. As such, the static resistant slats 14 reduce errors with respect to filling the cavities 22 with product (i.e., reducing the likelihood of product either failing to enter a slat cavity from a hopper, prematurely exiting a slat cavity prior to dispensation into a bottle, or failure of the product to exit a slat cavity and enter a bottle at a dispensing location). The static resistant slats 14 thereby minimize down time associated with conventional conveyor devices. Additionally, because the slats 14 minimize the generation and carrying of a static charge by the product conveying system 10, the slats 14 reduce the likelihood that the electronics controlling the conveyor device 10 (i.e., the inspection system 62) can malfunction as a result of exposure to static electricity and increase the likelihood of the electronics detecting the correct number of individual products carried by the slats 14.

The anti-static feature of the slats 14 can also reduce the attraction of dust and other contaminants to the slats 14, thereby allowing the slats to be easily cleaned. In the case where the slats 14 are used to transport pharmaceutical products, the anti-static feature of the slats 14 minimizes the attraction of dust associated with the product (e.g., dust created by the products themselves), thereby increasing overall environmental safety in a facility utilizing the product conveying system 10.

While various embodiments of the invention have been particularly shown and described, it will be understood by those skilled in the art that various changes in form and details may be made therein without departing from the spirit and scope of the invention as defined by the appended claims.

As indicated above, in the product conveying system 10 includes the transport mechanism 13, such as the set of slats 14 that are formed from a static resistant or static dissipative material. In one arrangement, the product conveying system 10 includes additional other a static resistant or static dissipative components.

For example, as indicated above, the product conveying system 10 includes a product control strip brush 24 that removes dust from the product and slats 14 and pushes any individual product elements not contained by a cavity 22 (i.e., stragglers) back into a slat hopper fill area. However, traditional, nylon bristles, when in contact with conventional polyethylene slats, can create a triboelectric effect due to the differences in the nylon and polyethylene materials as they rub against each other. In one arrangement, the bristles of the brush 24 are formed from a static-dissipative material or a static-resistive material, such as a static-dissipative or a static-resistive nylon material. For example, the bristles of the brush can be manufactured from a type of nylon with encapsulated anti-static additives. The additive can incorporated with the nylon polymers forming the bristles to minimize dispersing of the additive from the bristles in use. Use of a static-dissipative or static-resistive brush 24 can further enhance the static resistant properties of the product conveying system 10.

Additionally, other anti-static components can be utilized in the system 10 to further limit the build-up of a static charge on components of the system 10. For example, with reference to FIG. 2, a static eliminator bar can be disposed in proximity to the brush 24 to limit the build-up of a static charge on each slat 14. In another example, a static eliminator bar can be disposed in proximity to the dispensing area 20 to limit the build-up of a static charge on components of the system 10.

As described above, the trailing wall portion 30 of the slat 14 is configured as being substantially orthogonal to the upper surface of the slat 14. Such description is by way of example only. In one arrangement, the trailing wall portion is sloped relative to the upper surface of the slat 14. For example, while the trailing wall portion 30 can be sloped in a variety of ways, the trailing wall portion 30 can be radiused, curved, or angled, or any combination thereof, relative to the upper surface of the slat 14.

As described above, each slat of the set of slats 14 is configured to receive product from the hopper 18 and to carry the product to the dispensing area 20. For example, each slat 14 defines a set of cavities 22 configured to carry product as part of the product conveying system 10. Such description is by way of example only. In one arrangement, as illustrated in FIGS. 6-8, each slat is configured as a slat blank 14' that does not define cavities for carrying product. In one arrangement, the slat blanks 14' are configured to limit or prevent the product gate 70 from dispensing product into chutes 71. The slat blanks 14' are manufactured from a static-dissipative or a static-resistive material to minimize or eliminate the build-up of an electrical or static charge on the product conveying system 10.

What is claimed is:

1. A slat defining at least one cavity sized to receive a product from a hopper, the slat being formed from a static-resistant material that minimizes the build-up of static associated with a product conveying system when carrying the product from the hopper to a dispensing area;

wherein the static-resistant material comprises a Food and Drug Administration (FDA)-approved high-density polyethylene (HDPE) material;
  wherein the static-resistant, FDA-approved HDPE material is ULTRA ETHYLUX;
  wherein the static-resistant, FDA-approved HDPE material is configured to be machined while maintaining a relatively smooth external surface finish on the slat; and
  wherein the static-resistant, FDA-approved HDPE material comprises:
  a specific gravity of 0.95;
  a tensile strength of about 3800 psi;
  a flexural strength of about 5500 psi;
  a flexural modulus of about 135,000 psi;
  a melt temperature of about 375° F.; and
  a mold temperature of about 100° F.

2. The slat of claim 1, wherein the at least one cavity of the slat defines a leading wall portion, the leading wall portion being sloped relative to an upper surface of the slat, the leading wall portion configured to guide the product into the at least one cavity.

3. The slat of claim 2, wherein the at least one cavity of the slat defines a trailing wall portion, the trailing wall portion being substantially orthogonal to the upper surface of the slat.

4. The slat of claim 1, wherein the static-resistant, FDA-approved HDPE material comprises a polyethylene material content between about 80% and 90% weight and an antistatic additive material content between about 10% and 20% weight.

5. The slat of claim 4, wherein the antistatic additive material is substantially homogenously and permanently incorporated into the polyethylene material.

6. The slat of claim 1, wherein the static-resistant, FDA-approved HDPE material comprises a surface resistivity of between about $10^9$ and $10^{11}$ ohms/square.

7. The slat of claim 1, wherein the slat comprises a first end and a second end, the second end opposing the first end along a longitudinal axis of the slat, the slat defining a first drive coupling interface at the first end of the slat and a second drive coupling interface at the second end of the slat, the first drive coupling interface and the second drive coupling interface configured to couple to a drive mechanism of a product dispensing apparatus.

8. The slat of claim 7, wherein:
  the first drive coupling interface is configured as a clearance fit with a first set of connection elements of the drive mechanism; and
  the second drive coupling interface is configured as a clearance fit with a second set of connection elements of the drive mechanism.

\* \* \* \* \*